United States Patent
Humhauser (10) Patent No.: US 12,497,907 B2
(45) Date of Patent: Dec. 16, 2025

(54) INNER RING SEGMENT, AXIALLY DIVIDED INNER RING AND VARIABLE VANE CASCADE FOR AN AIRCRAFT ENGINE

(71) Applicant: MTU Aero Engines AG, Munich (DE)

(72) Inventor: Werner Humhauser, Moosburg (DE)

(73) Assignee: MTU Aero Engines AG, Munich (DE)

( * ) Notice: Subject to any disclaimer, the term of this patent is extended or adjusted under 35 U.S.C. 154(b) by 0 days.

(21) Appl. No.: 18/885,163

(22) Filed: Sep. 13, 2024

(65) Prior Publication Data
US 2025/0092796 A1    Mar. 20, 2025

(30) Foreign Application Priority Data
Sep. 20, 2023    (DE) .................... 10 2023 125 526.6

(51) Int. Cl.
*F01D 17/14* (2006.01)
*F01D 9/04* (2006.01)
*F01D 17/16* (2006.01)

(52) U.S. Cl.
CPC ............ *F01D 17/14* (2013.01); *F01D 9/041* (2013.01); *F01D 17/16* (2013.01); *F01D 17/162* (2013.01); *F05D 2220/323* (2013.01)

(58) Field of Classification Search
CPC .......... F01D 17/14; F01D 9/041; F01D 17/16; F01D 17/162
See application file for complete search history.

(56) References Cited

U.S. PATENT DOCUMENTS

| | | | | |
|---|---|---|---|---|
| 4,604,030 | A * | 8/1986 | Naudet | F01D 11/001 415/126 |
| 4,792,277 | A * | 12/1988 | Dittberner, Jr. | F01D 17/162 415/190 |
| 4,990,056 | A * | 2/1991 | McClain | F01D 11/001 29/889.22 |
| 5,636,968 | A * | 6/1997 | Audet | F04D 29/563 415/162 |
| 6,129,512 | A * | 10/2000 | Agram | F01D 17/162 415/229 |
| 6,790,000 | B2 * | 9/2004 | Wolf | F01D 25/243 415/165 |
| 7,713,022 | B2 * | 5/2010 | Major | F01D 17/162 29/889.22 |
| 9,617,861 | B2 * | 4/2017 | Klaen | F01D 9/02 |
| 9,932,988 | B2 * | 4/2018 | Maliniak | F04D 29/563 |
| 10,066,668 | B2 * | 9/2018 | Zotz | F01D 9/042 |
| 10,385,719 | B2 * | 8/2019 | Maliniak | F04D 29/563 |
| 10,385,872 | B2 | 8/2019 | Hugon et al. | |

(Continued)

FOREIGN PATENT DOCUMENTS

| | | |
|---|---|---|
| DE | 3874439 T2 | 2/1993 |
| DE | 102013211629 A1 | 1/2015 |

(Continued)

*Primary Examiner* — Brian Christopher Delrue
(74) *Attorney, Agent, or Firm* — Hinckley, Allen & Snyder, LLP; David R. Josephs (57) ABSTRACT

The invention relates to an axially divided inner ring as well as a variable vane cascade for an aircraft engine. The inner ring and the vane cascade improve the efficiency of the aircraft engine in that differently formed vanes and/or vane mounts are formed respectively in the inner ring or in the vane cascade.

12 Claims, 4 Drawing Sheets

(56) References Cited

U.S. PATENT DOCUMENTS

| | | | | |
|---|---|---|---|---|
| 10,626,742 | B2* | 4/2020 | Albers | F01D 9/041 |
| 11,300,004 | B2* | 4/2022 | Stiehler | F01D 17/162 |
| 11,519,284 | B2* | 12/2022 | Krumanaker | F02C 7/28 |
| 2003/0170115 | A1* | 9/2003 | Bowen | F01D 9/02 |
| | | | | 415/160 |
| 2005/0132707 | A1* | 6/2005 | Gebhardt | F02C 7/20 |
| | | | | 60/726 |
| 2015/0016984 | A1* | 1/2015 | Klaen | F01D 17/162 |
| | | | | 29/889.21 |
| 2016/0377087 | A1* | 12/2016 | Jakimov | F04D 29/083 |
| | | | | 415/148 |
| 2017/0261003 | A1* | 9/2017 | Mouton | F04D 29/644 |
| 2021/0222575 | A1* | 7/2021 | Breeze-Stringfellow | |
| | | | | F01D 25/12 |
| 2023/0099406 | A1* | 3/2023 | Humhauser | F01D 9/042 |
| | | | | 415/191 |

FOREIGN PATENT DOCUMENTS

| | | | |
|---|---|---|---|
| EP | 1524412 A2 | | 4/2005 |
| EP | 2093380 B1 | | 1/2017 |
| EP | 3056683 B1 | | 5/2018 |
| EP | 3170987 B1 | * | 2/2020 |
| EP | 4030039 A1 | | 7/2022 |
| FR | 2582720 B1 | * | 6/1989 |
| FR | 2824593 B1 | | 7/2003 |

* cited by examiner

INNER RING SEGMENT, AXIALLY DIVIDED INNER RING AND VARIABLE VANE CASCADE FOR AN AIRCRAFT ENGINE

BACKGROUND OF THE INVENTION

The invention relates to an axially divided inner ring for a variable vane cascade for an aircraft engine, comprising a plurality of inner ring segments that are divided in the axial direction and are lined up with respect to one another in the peripheral or circumferential direction, wherein, in at least one of the inner ring segments, a row of vane mounts is formed. The invention further relates to a vane cascade for an aircraft engine, comprising a group of variable vanes and an axially divided inner ring on which the variable vanes are mounted, wherein the inner ring is formed from a plurality of inner ring segments and wherein at least one and, in particular, each one of the plurality of inner ring segments has a row of vane mounts for mounting at least a part of the group of vanes. The inner ring mounts the vanes at their vane roots, which have at least one outer plate and a vane journal and, in some embodiments, an inner plate.

The components of an aircraft engine are arranged around or on an engine shaft. Therefore, three main axes are defined in order to describe the geometries occurring in the aircraft engines. The first main axis extends in the direction of the rotational axis of the engine and is also referred to as the longitudinal axis, which extends in the axial direction. The first main axis is used to define a front and a rear of the respectively regarded geometry, with the inflow of the flowing gas occurring in the front and the outflow of the flowing gas occurring in the rear. The second axis extends along a direction that is perpendicular to the rotational axis of the engine and is also termed a radial axis, which extends in the radial direction. The second main axis is used to define an inside and an outside of the engine, with the engine axis lying inside and the radial direction extending outside from the engine axis. The third main axis extends in the circumferential direction perpendicular to the two other main axes. The three main axes together define three main planes: meridional sections, which may also be referred to as meridional planes and which are spanned by the longitudinal axis and, in each instance, one radial axis; circumferential planes, which lie on a cylindrical outer surface around the rotational axis of the engine; and cross-sectional planes of the engine, which are arranged perpendicular to the rotational axis of the engine.

The inner ring and the variable vane cascade are usually arranged in a core flow channel of the aircraft engine. The core flow channel is bounded by an outer housing and an inner housing, with the inner ring together with outer plates of the vanes forming a part of the inner housing. A common function of both the inner ring for the variable vane cascade and the variable vane cascade is the formation of an inner air seal, for which purpose the inner ring is held, on the one hand, by the vanes of the vane cascade and is formed, on the other hand, with a seal ring. On the seal ring, there are seal linings, which interact with corresponding seal fins on the rotor and form a labyrinth seal for sealing a radial gap between the rotor and the stator.

The connection between the inner ring and the vane roots is subject to leakage. In order to minimize this leakage flow, two construction designs are known in principle from the prior art for inner air seals on variable vanes of a core flow channel.

The first principle relates to floating inner air seals, that is, inner air seals subject to play. The inner ring can consist of two half-ring segments that extend over 180° in the circumferential direction and are guided in a spoke-centered manner at the sliding faces of the inner vane journal of the variable vanes. The inner ring has vane mounts, which are formed with play in the radial direction, so that the variable vanes that are arranged in the vane mounts can move at least in the radial direction. In the axial direction and in the circumferential direction, the connection is formed with minimal play or else with a perfect fit in order to minimize the leakage. The half-ring segments can be divided into front and rear sections in the axial direction and in this case are generally bolted together or else connected to each other through pins. An example of this embodiment is known from EP 2 093 380 A1. The half-ring segments can also be formed in one piece and can be mounted on the vanes from the inside by means of an elastic deformation. In this construction principle, the inner ring can expand freely and move radially and is radially controlled in the rotor cavity through its own thermal surrounding conditions.

Owing to the nearly play-free kinematics, the inner air seals that are subject to play exhibit a good guiding of the inner ring, but tend to undergo thermal cording, which, in turn, leads to a larger radial gap of the inner air seals and to a pressing and/or a wedging of the front sides of the inner ring segments.

The second principle relates to so-called vane-tied inner air seals. In this case, the vanes are guided not only in the axial direction and in the circumferential direction, but also in the radial direction. In the intendment of the present description, guiding or to guide means that the connection is executed with minimal play or with a perfect fit. Usually, inner ring segments with a circumferential extension of markedly less than 180° are chosen. The inner ring segments are axially undivided and, in the radial direction, have a gap-free connection with the sliding faces of the inner vane journal of the vanes. This connection is produced generally through a connection via pins in a groove of the rotating journal. In this construction principle, the vanes cannot move in the mounts of the inner ring in a radially free manner. The inner ring segments are moved radially from the outer housing of the core flow channel via the vanes, on the inner journals of which they are locked. The radial control is produced through the thermal surrounding conditions of the outer housing in conjunction with the length expansion of the vanes.

A drawback in the case of the vane-tied inner air seals in a one-piece design is that the segment size is limited by the necessity of mounting them on the journals from radially inside. Due to the fact that the vanes are angled in the circumferential direction, this mounting also necessitates a sufficiently large gap between the vane plates and the bored holes in the inner ring segments, which leads to an increased leakage at the plates, thereby leading, in turn, to an aerodynamic loss. The locking via the pins on the rotating vane journals cannot be mounted via bushings. The resulting line contact is subject to wear, which has a direct effect on the sealing gap.

SUMMARY OF THE INVENTION

In contrast to this, the object of the invention is to specify an inner ring and a variable vane cascade with an inner ring for an aircraft engine that improve the efficiency of the aircraft engine with respect to the cited embodiments of the prior art.

This object is achieved by an inner ring segment, an inner ring, and a variable vane cascade of the present invention.

An axially divided inner ring segment according to the invention for a vane cascade of an aircraft engine—wherein the vane cascade has a group of variable vanes and wherein the vanes each have a vane root-comprises a row of vane mounts for mounting the vane roots of the group of variable vanes. The object is achieved in that the row of vane mounts comprises at least one play mount and at least one guide mount that differs from the at least one play mount and in that the at least one guide mount is formed differently from the at least one play mount in regard to a geometry for mounting the vane roots.

An axially divided inner ring according to the invention for a vane cascade of an aircraft engine—wherein the vane cascade has a group of variable vanes and wherein the vanes each have a vane root—comprises a plurality of inner ring segments that are divided in the axial direction, wherein, in at least one of the inner ring segments, a row of vane mounts is formed for mounting the vane roots of the group of variable vanes.

The guide mounts have a guide, that is, a tighter connection, to the variable vanes arranged in it, which is subject to less play at least in one direction than the play mounts. The guide mounts make it possible advantageously to create a tighter connection between the guide mounts and the vanes that are arranged in the guide mounts and thereby can essentially lead to a direct transmission of force between the guide mounts and the corresponding vanes, in particular guide vanes. It is thereby possible, by way of more adroit placement of the guide mounts in the row of the vane mounts, for the inner ring with the inner ring segments to be better adjusted to the prevailing temperatures, so that temperature fluctuations and thereby resulting material expansions have less effects on the leakage gaps, while, at the same time, a specific and improved guiding of the inner ring position takes place, thereby increasing overall the efficiency of the aircraft engine. Furthermore, in the case of an inner ring that is better adjusted in this way, the cording is also reduced, as a result of which, in particular, the wear between the inner ring segments is reduced and hence the lifetime is positively influenced. It is obvious that the play mounts also have such a small gap with respect to the vanes arranged in them that the aerodynamic losses are minimized to the greatest extent possible.

The inner ring can be designed, in particular, for a stator stage of a compressor. However, it is also conceivable that the inner ring is designed for a stator stage of a turbine. The inner ring serves—as already described in the introductory section—to produce an inner air seal and forms a part of an inner housing of a core flow channel of the aircraft engine. The number of vane mounts can be designed to be the same in all inner ring segments. The vane mounts are essentially complementary in form to the corresponding vane roots that are to be mounted in them and, preferably, can be formed in the axial direction and/or in the circumferential direction with a perfect fit. The vane roots of the vanes of the vane cascade can have at least one first outer plate that faces the core flow channel and a following vane journal that is arranged radially inward on it. Correspondingly complementary to this, the vane mounts can be formed with a corresponding outer plate seat and journal seat. One of the variable vanes and a vane mount that mounts this vane form a sliding pairing and are sliding partners. Such a connection of the vanes and the vane mounts formed as a sliding pairing can comprise a sliding device, in particular a sliding bushing and/or sliding coating. The sliding device can hereby be part of one or both of the sliding partners. At least either the vanes or at least the vane mounts or both sliding partners can surround the sliding device entirely or at least in part. The inner ring segment can be formed from at least two inner ring segment sections that rest against one another in the axial direction. Both the wording "axially divided inner ring" and the wording "axially divided inner ring segment" comprise as such embodiments that, on account of the division of the inner ring or of the inner ring segment, have contact surfaces that do not extend in the radial direction or extend only proportionately in the radial direction. Preferably, the row of the vane mounts can be arranged along a circumferential extension of the inner ring segment between a first end and a second end of the inner ring segment in a uniformly distributed manner.

Further advantages and features ensue from the following description of some preferred exemplary embodiments as well as the dependent claims.

In an advantageous embodiment of the invention, the row of vane mounts comprises exactly two guide mounts. The vane cascade forms a suspension system, with the inner ring being suspended on the vanes. Through the arrangement of exactly two guide mounts, the system of vane suspension is completely determined, thereby reducing even more strongly any cording. Alternatively or additionally, it can be provided that a vane cascade with the inner ring has exactly two guide vanes, which are arranged with a perfect fit in the vane mounts provided for them.

In a further advantageous embodiment of the invention, the at least one guide mount is arranged in the row adjacent to two play mounts. This arrangement allows the even more specific guiding of the inner ring on the vanes, whereby, at the same time, there is provided a play that permits the material expansions in a predetermined and thus advantageously largely undamaging way.

In an advantageous further development of the invention, it is provided that, at a second position in the row of the vane mounts and/or at a penultimate position in the row of the vane mounts, a guide mount is arranged. Owing to the fact that at least one play mount is arranged in the circumferential direction outward in the row of the vane mounts, any cording is advantageously optimally reduced.

Furthermore, in a further advantageous embodiment of the invention, it can be provided that only guide mounts in the row of the vane mounts have an inner plate seat for an inner plate of the guide vanes. This configuration presumes that the group of vanes comprises at least one play vane and at least one guide vane that differs from the at least one play vane and that the at least one guide vane is formed differently from the at least one play vane in regard to a geometry of the vane roots and that at least one vane root of the at least one guide vane has an inner plate. This design makes it possible advantageously to arrange the vanes tighter with respect to one another, because the vanes form a guide vane cascade that is angled in the circumferential direction and the radially inner used space of the vanes in the inner ring represents the limiting factor in this respect. In this way, it is possible to create improved vane cascade geometries. The herein described inner plate, vane journal, and outer plate can be essentially cylindrical in form, with the vane journal, in particular, being able to have a smaller cylindrical diameter than the vane plate, that is, the corresponding inner plate and outer plate.

A further advantageous embodiment of the invention presumes that the vane roots that are arranged in the row of the vane mounts have at least one first outer plate that faces a core flow channel of the aircraft engine and a vane journal that is situated on it radially inward and that the vane roots are each formed with an inner plate that is arranged on the vane journal radially inward and is opposite-lying to the outer plate. In the advantageous embodiment, the at least one guide mount can then be formed differently from the at least one play mount in regard to radial gaps between the outer plates and/or the inner plates of the vane roots to be mounted on the one hand and the vane mounts on the other hand. Owing to the differently formed radial gaps, it is possible to compensate even better for the thermal shifts arising along the circumferential extension of the inner ring or the inner ring segment, because the geometries of the different vane mounts can be adjusted to the prevailing temperatures or to the thermal stresses arising in the components.

In a further advantageous embodiment of the invention, the radial gaps in the guide mounts are formed to be minimal in relation to a radial size and in relation to manufacturing tolerances, so that the guide mount and a guide vane to be arranged in it are formed in the radial direction with a perfect fit with respect to each other. In this way, a perfect-fit bearing seat of the variable guide vanes on the inner ring in the radial direction is advantageously created, so that a shift of the inner ring via the guide vanes is guided radially in an immediate and direct manner. The cording is thereby strongly reduced. The remaining vanes are mounted in a floating manner in the play mounts in the radial direction, so that no radial forces are transmitted via them. In this way, it is possible largely to compensate for a thermal deformation of the inner ring.

In a preferred embodiment of the invention, the inner ring is formed in the circumferential direction from at least three inner ring segments, in particular from at least four inner ring segments, especially preferably from at least five or more inner ring segments. The inner ring segments are lined up with respect to one another in the circumferential direction. Owing to the division of the inner ring in the circumferential direction, a distortion of the inner ring is advantageously prevented. Any cording and/or other kind of distortion is advantageously better reduced.

In a further improved embodiment of the invention, it is provided that each inner ring segment in the respective row of vane mounts has between five and twelve vane mounts. The small number of vanes enables the inner ring segments to be easily mounted on the vanes and vice versa. More or fewer vane mounts in an inner ring segment are also conceivable. The inner ring segments can also have different numbers of vane mounts. Preferably, between six and eleven vane mounts are provided in each inner ring segment. Especially preferably, between eight and ten vane mounts are provided in each inner ring segment.

In an especially advantageous embodiment, the inner ring is further developed in such way that the inner ring further comprises a seal carrier consisting of a plurality of seal carrier segments, that the seal carrier forms a radially inner-lying rest for the vane roots of the vane on one vane mount or a plurality of vane mounts of the row of the vane mounts, and/or that, in each instance, circumference-side front sides of the inner ring segments and circumference-side front sides of the seal carrier segments are arranged offset with respect to one another. As a result of this, disadvantageous curvatures are further reduced and seal carriers as well as inner ring segments mutually support one another against distortion.

A second aspect of the invention relates to a variable vane cascade for an aircraft engine, comprising at least one group of variable vanes with vane roots and an axially divided inner ring on which the vane roots of the variable vanes are mounted, in particular one of the axially divided inner rings described further above, wherein the inner ring is formed from a plurality of inner ring segments and wherein at least one and, in particular, each one of the plurality of inner ring segments has a row of vane mounts for mounting the vane roots of the at least one group of vanes. The guide vane stage solves the problem in that the at least one group of vanes comprises at least one guide vane that is formed differently from the remaining vanes, in particular the play vanes, in the group of vanes in regard to a geometry forming a connection between the vane mounts and the vane roots and/or that the row of the vane mounts comprises at least one guide mount that is formed differently from the remaining vane mounts, in particular the play mounts, of the row of the vane mounts in regard to the geometry forming a connection between the vane mounts and the vane roots.

Owing to the different connections of the vanes and vane mounts, the variable vane cascade can respond very well to the thermal conditions, reduces the leakages in comparison to vane cascades known from prior art, and thereby improves the efficiency of the aircraft engine.

In a further advantageous embodiment of the variable vane cascade, it is provided that, in each instance, one of the vane mounts and one of the vane roots form, as sliding partner, a sliding connection and that at least one of the sliding partners has a sliding device, in particular a bushing or a coating. A sliding device, in particular a bushing or coating, further improves the sliding properties of the sliding partner and thereby, on the one hand, reduces the wear, so that the lifetime increases, and, on the other hand, reduces the leakage, because reduced tolerances can be observed. Bushings can be provided in a divided design. The bushings can be axially divided and can be arranged during mounting together with the inner ring segment sections on the vane roots. They can also be provided jointly with the vanes, with the inner ring segment sections then being arranged around the bushing.

In the intendment of the present invention, the sliding device is regarded as part of the vane or the vane mount and, accordingly, can also form a part of the snug fit or the overall snug fit of the guide vane in the guide mount or a part of the snug fit or the overall snug fit of the guide mount around or in the guide vane.

In an especially advantageous embodiment of the vane cascade, the guide mounts each have a collar flange that projects inward, is arranged between an inner plate and an outer plate of the guide vane arranged in the respective guide mount in the radial direction, and is formed with a minimal play and/or a minimal radial gap between the collar flange on the one hand and the inner plate and the outer plate on the other hand, in particular with a perfect fit. It can be provided that only the guide mounts have a perfect-fit collar flange between the inner plate and the outer plate. It can be provided that the play vanes also have a collar flange, which is arranged between an inner plate and an outer plate of the play vane arranged in the respective play mount in the radial direction, with a play and/or gaps between the collar flange of the play mount on the one hand and the inner plate and the outer plate of the corresponding play vane on the other hand being formed.

In a further preferred embodiment of the vane cascade, it is provided that the at least one group of the vanes comprises at least two guide vanes and/or that, in the row of the vane mounts, at least two play vanes are arranged adjacent to the at least one guide vane and/or that, at a second position in the row of the vane mounts and/or at a penultimate position in the row of the vane mounts, a guide vane is arranged. Through the specific layout of the combinations of vanes and vane mounts proposed here, it is possible advantageously to reduce and/or to compensate for the thermal expansions of the vane cascade. Furthermore, the inner ring can be guided better at the vanes in the radial direction, so that a cording of the inner ring segments is advantageously reduced.

A third aspect of the invention relates to an aircraft engine with a variable vane cascade, in particular with a variable vane cascade as described above and/or with an axially divided inner ring as described.

BRIEF DESCRIPTION OF THE DRAWING FIGURES

The invention is explained in detail in regard to the following drawings on the basis of some preferred exemplary embodiments of the invention.

DESCRIPTION OF THE INVENTION

Figure 1:
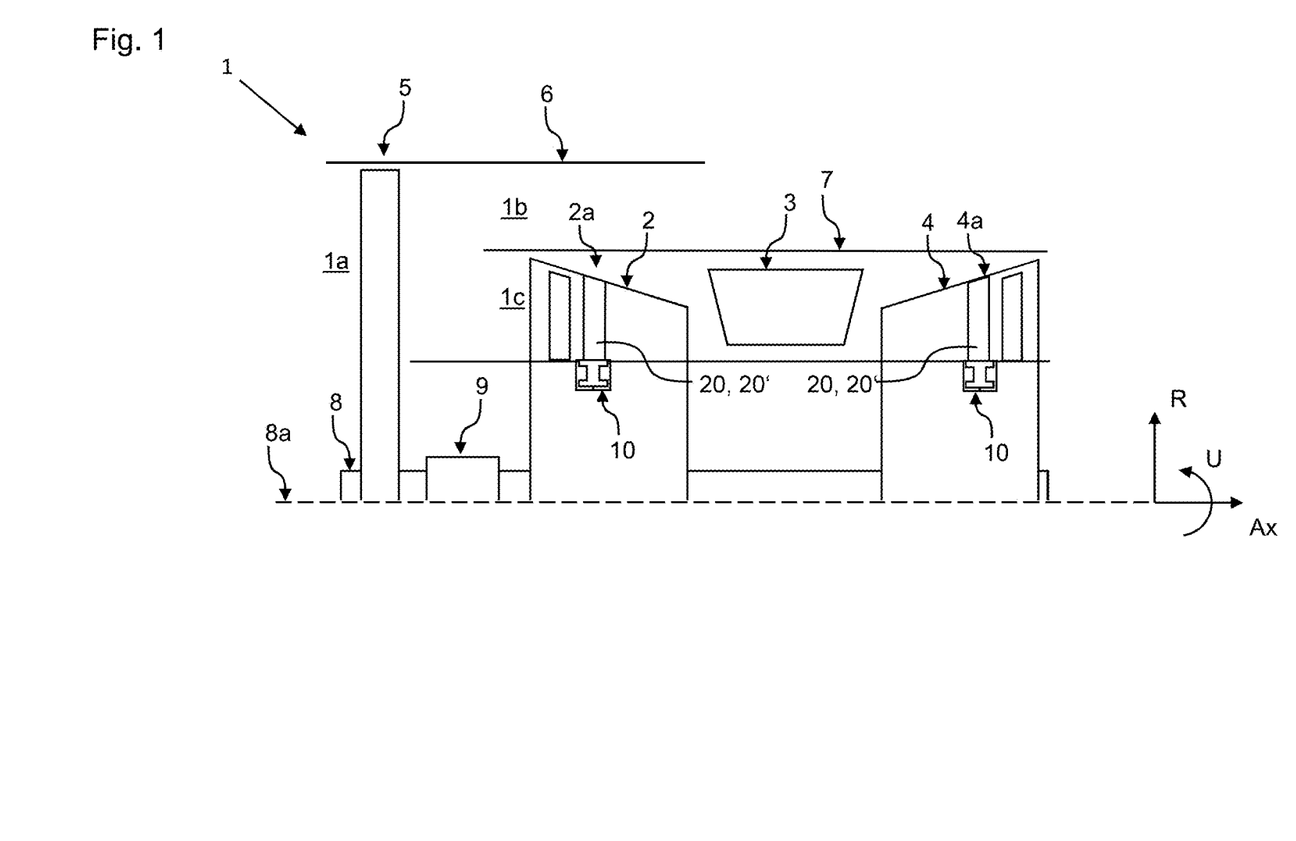
FIG. 1 shows a meridional section of an aircraft engine with a first exemplary embodiment of a vane cascade according to the invention.

Illustrated schematically in FIG. 1 is an aircraft engine 1 in a meridional section. The aircraft engine 1 has an engine inlet 1a, out of which a flow travels downstream into a secondary flow channel 1b and a core flow channel 1c. The secondary flow channel 1b serves for the generation of thrust; the core flow channel 1c serves primarily for the production of energy for the components of the aircraft engine 1 and the cabin system of an aircraft. Arranged in succession in the core flow channel 1c are the main components of the aircraft engine 1, namely, a compressor 2, a combustion chamber 3, and a turbine 4. The aircraft engine 1 has an outer housing 8 that surrounds the engine inlet 1a as well as the secondary flow channel 1b and an intermediate housing 7 that separates the secondary flow channel 1b and the core flow channel 1c. Provided in the engine inlet 1a is a fan 5 for air intake and initial compression of the air. The fan 5, the compressor 2, and the turbine 4 are coupled mechanically by means of at least one shaft 8 that rotates around a rotational axis of the engine 8a, whereby the fan 5 and, if need be, also front low-pressure compressor stages (not depicted) can be decoupled from the more rapidly rotating turbine 4 by way of a gearbox 9. A portion of the air that is sucked in by the fan and compressed flows into the core flow channel 1c, where it is strongly compressed by the compressor 2 in order to be mixed with fuel in the combustion chamber 3 and ignited and finally expanded in the turbine 4 for driving the at least one shaft 8.

The aircraft engine 1 and the components thereof are described in a shaft-fixed cylindrical coordinate system comprising an axial direction Ax, a radial direction R, and a circumferential direction U.

Illustrated in FIG. 1 are two exemplary embodiments of a vane cascade 2a, 4a according to the invention with, in each case, a group of the vanes 20, 20' and an inner ring 10 according to the invention. A first exemplary embodiment is formed as a compressor vane cascade 2a in the compressor 2 and a second exemplary embodiment is formed as a turbine vane cascade 4a in the turbine 4. It is obvious that the group of the vanes 20, 20' and the inner rings 10 of the compressor vane cascade 2a and of the turbine vane cascade 4a differ from each other. In the following description, the invention is described in detail on the basis of a vane cascade 2a, formed as a compressor vane cascade 2a.

Figure 2:
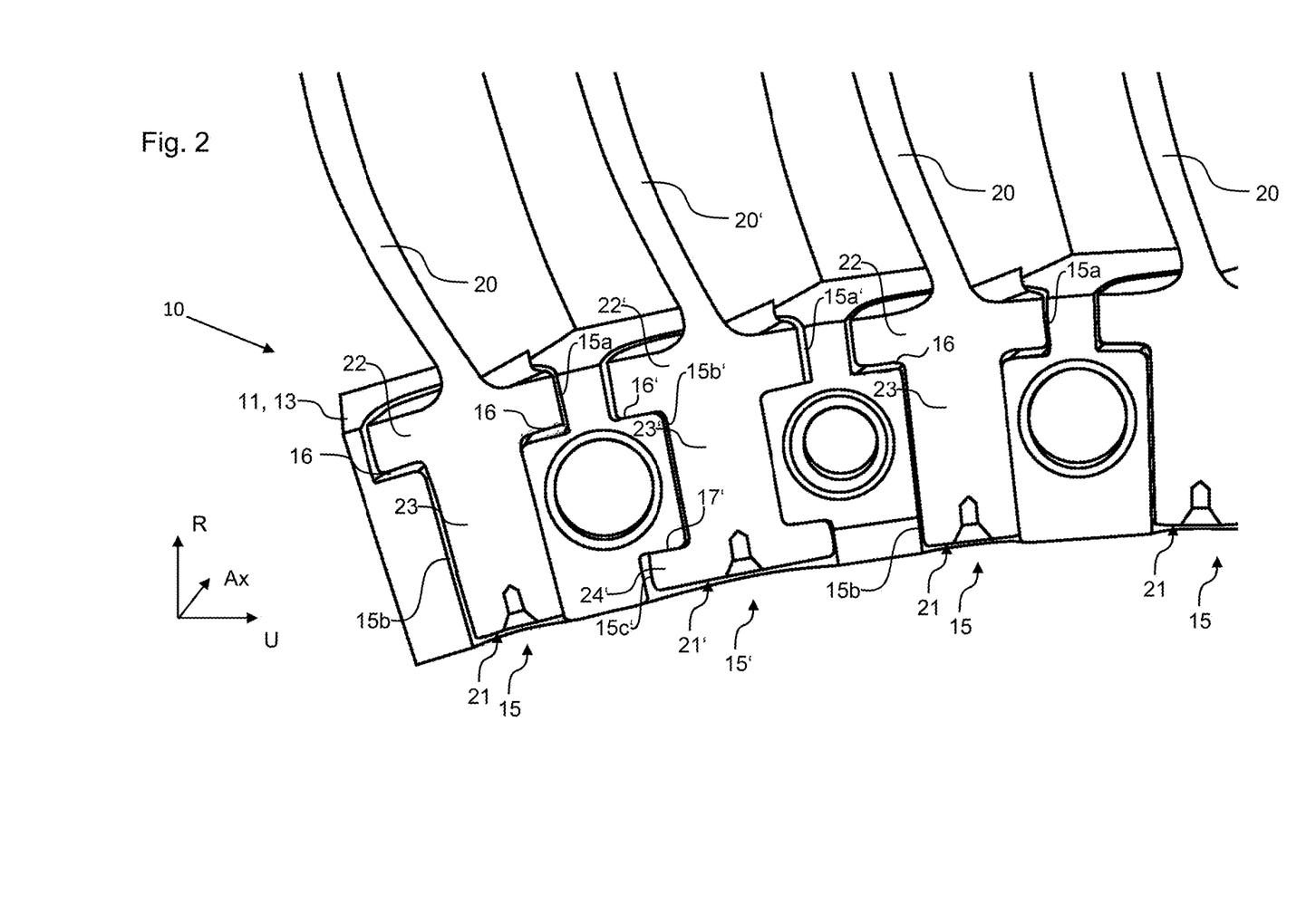
FIG. 2 shows a cross section of the first exemplary embodiment of a compressor vane cascade according to the invention with an inner ring according to the invention.
Figure 3:
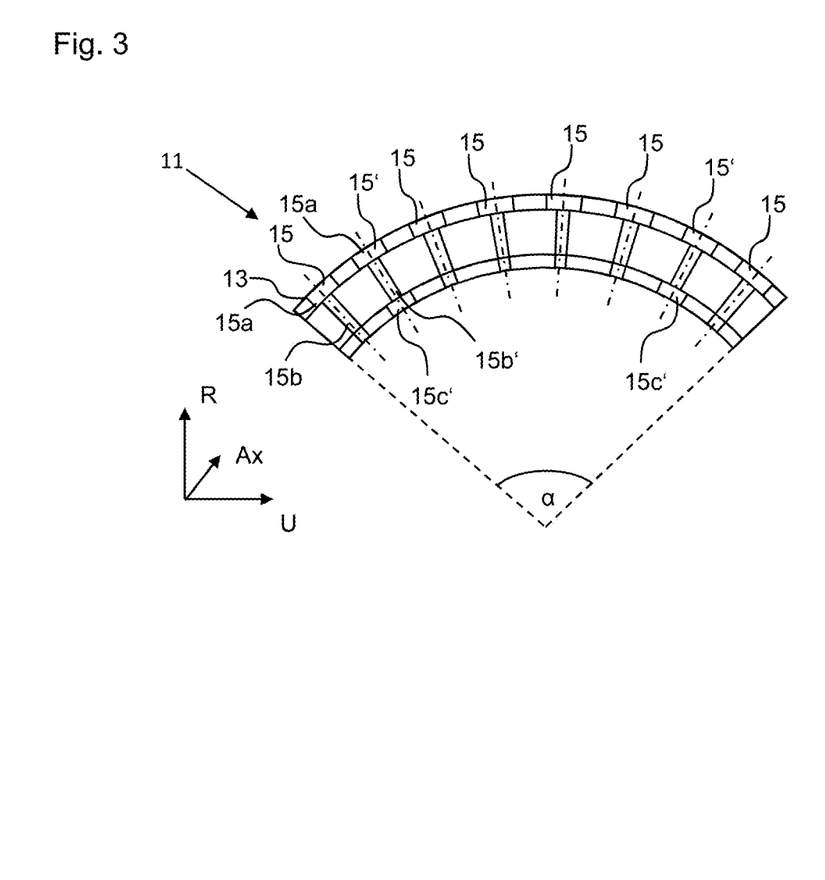
FIG. 3 shows a cross section of the first exemplary embodiment of the inner ring according to the invention.

The first exemplary embodiment of a vane cascade 2a in a cross section through the vane cascade 2a is illustrated schematically in FIG. 2 and FIG. 3 and is explained in detail on the basis of the following description. The vane cascade 2a comprises an inner ring 10 and a group of the vanes 20, 20'. In FIG. 2, solely a rear inner ring segment section 13 of a single inner ring segment 11 of the inner ring 10 is shown. The inner ring 10 consists of a plurality of inner ring segments 11, which are lined up with respect to one another in the circumferential direction U. The illustrated inner ring segment 11 has a row of vane mounts 15, 15', in which the group of the vanes 20, 20' with their vane roots 21, 21' are mounted and, in each instance, engage in a sliding connection, whereby the vanes 20, 20' are arranged pivotably and thus variably in the vane mounts 15, 15'.

The vane roots 20, 20' of all vanes of the group of the vanes 20, 20' are formed with an outer plate 22, 22', which, together with an outer surface of the inner ring segment 11, forms a part of an inner housing of the core flow channel 1c. In order for the outer plates 22, 22' to be mounted, the vane mounts 15, 15' each have an outer plate seat 15a, 15a', which is complementary to the outer plate 22, 22'. Arranged radially inner-lying on the respective outer plate 22, 22' is a vane journal 23, 23', with the vane journal 23, 23' having a smaller diameter than the respective outer plate 22, 22'. The vane mounts 15, 15' have corresponding outer plate seats 15a, 15a' and journal seats 15b, 15b', which form a sliding connection with the vane roots 21, 21', in particular with the outer plates 22, 22' and the vane journals 23, 23' as sliding partners. The possible connection surfaces of the sliding partners are formed with a sliding coating as sliding device in order to improve the frictional and sliding properties of the sliding partners.

In the present exemplary embodiment, two kinds of vanes and two kinds of vane mounts are shown, namely, play vanes 20 and guide vanes 20' as well as play mounts 15 and guide mounts 15' that are complementary to them in the inner ring 10. The play vanes 20 are mounted in the play mounts 15 in a floating manner; that is, a small radial movement of the play vanes 20 is possible. In this way, the expansions and shifts of the inner ring 10 on account of high temperatures in an operating state of the aircraft engine 1 are compensated for very well. In contrast to the play vanes 20, the guide vanes 20' in the present exemplary embodiment have, in addition, an inner plate 24' that is arranged radially inward on their vane roots 21 in a complementarily formed inner plate seat 15c' of the guide mount 15'. This means that only guide mounts 15' have an inner plate seat 15c' for an inner plate 24' of the guide vanes 20'. This method of construction has, in addition, the advantage that the inner ring segments 11 in the inner radial region are formed more stably and the vanes can be arranged inward closer to one another. The outer plate seat 15a' and the inner plate seat 15c' bound a journal seat 15b' that is arranged between the plate seats and, as an inner flange, projects between the plates and forms with the plates 22', 24' of the guide vane 20' the radial gaps 16', 17', which, in relation to their radial size and tolerances, are minimally formed, so that a radial movement of the guide vane 20' in the guide mount 15' is hardly possible in contrast to the floating-mounted play vanes 20 in the play mounts 15. For a radial length change of the vanes, in particular, of the guide vanes, or for expansions in the intermediate housing 7 serving as an outer housing of the core flow channel 1c, the guide vanes 20' directly guide the inner ring 10 in operative connection with the guide mounts 15'. The inner ring segment 11 thus has a fixed seat in the radial direction and is guided in the radial direction on the guide vanes 20'.

As shown in FIG. 3, exactly two guide mounts 15' are arranged in the row of the vane mounts 15, 15', namely, at a second position of the row and (not shown) at a penultimate position of the row. Respective play mounts 16 are arranged adjacent to the two guide mounts 15' in the row of the vane mounts 15, 15'. This leads to a static determination of the connection of the inner ring to an outer housing, that is, to the intermediate housing 7 of the core flow channel 1c. In this way, an undetermined or, in particular, an overdetermined guiding of the inner ring segment 11 on the vanes 20, 20' is advantageously prevented.

The inner ring segment 11 extends over an angle α, which, in the present exemplary embodiment, amounts to 90°, so that the inner ring 10 is composed of four inner ring segments 11. It can be provided that the inner ring segments 11 extend over a different angle, such as, for example, over 120° or 60°. Correspondingly, the number of inner ring segments can be varied. The inner ring segments 11 each have a row of eight vane mounts 15, 15'. Accordingly, the group of the vanes 20, 20' likewise comprises eight vanes 20, 20'.

Figure 4A:
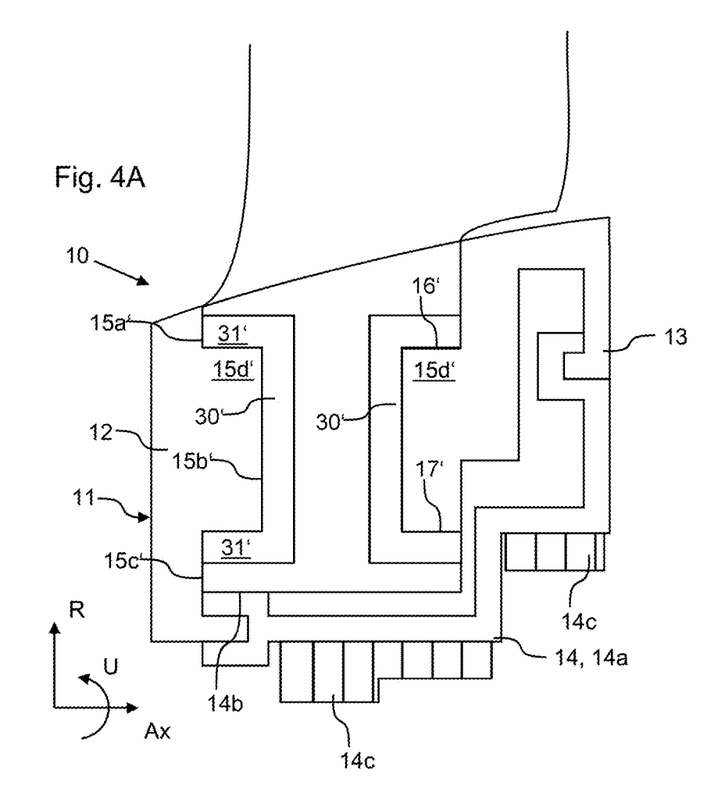
FIG. 4A shows a meridional section of a guide connection of a second exemplary embodiment of a vane cascade according to the invention with an inner ring according to the invention of FIG. 2.
Figure 4B:
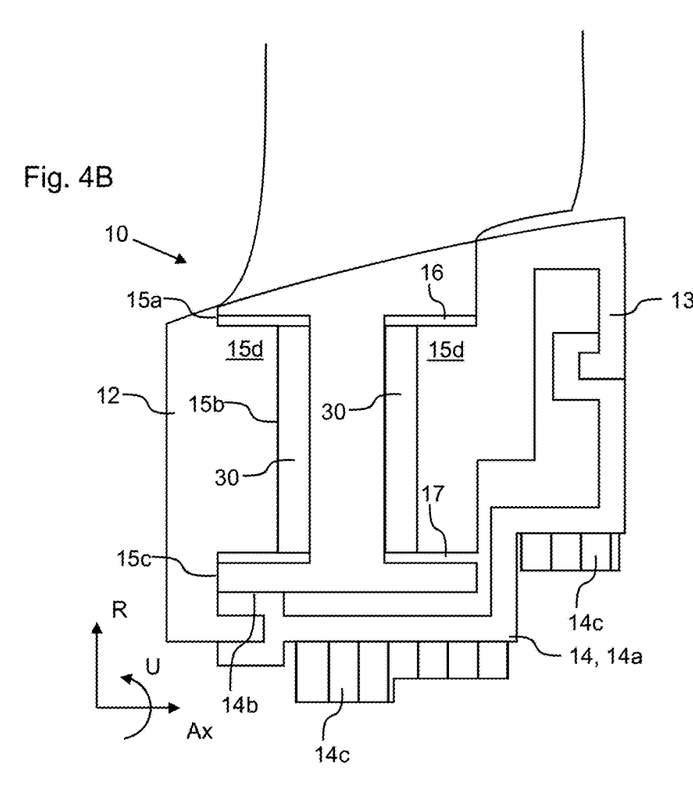
FIG. 4B shows a meridional section of a play connection of the second exemplary embodiment of a vane cascade according to the invention with an inner ring according to the invention.

FIG. 4A and FIG. 4B show a second exemplary embodiment of a vane cascade 4a formed as a turbine vane cascade 4a in the turbine 4. Illustrated here schematically in FIG. 4A is a first meridional section through a guide vane 20' and guide mount 15' and, in FIG. 4B, a second meridional section through a play vane 20 and a play mount 15. The inner ring 10 is formed from a plurality of inner ring segments 11, which are formed in the axial direction Ax from a front inner ring segment section 12 and a rear segment section 13. The segment sections 12, 13 rest against one another in the axial direction Ax and are fastened to one another via screws or bolts.

In contrast to the first exemplary embodiment, the play vanes 20 also have an inner plate 24. This has the advantage that the radial movement of the play vanes 20 in the play mounts 15 is also limited.

For the formation of the sliding connection, the vane roots 21, 21' each comprise sliding devices 30, 30' formed as bushings, which are arranged between the vane roots 21, 21' and the vane mounts 15, 15'. On the vane roots 21' of the guide vanes 20', the bushings 30' have guide flanges 31', which are arranged with a perfect fit in the radial direction R between the outer plates 22' and the inner flange 15d' as well as the inner flange 15d' and the inner plate 24'. In this way, it is possible for the guide vane 20' to pivot easily in the guide mount 15', because, on account of the bushing 30', less friction arises, while, at the same time, a radial relative movement between the guide mount 15' and the guide vane 20' is largely prevented, so that the inner ring 10 can be moved directly in the radial direction R of the guide vanes 20'.

In contrast, the bushings 30 between the play mounts 15 and the play vanes 20 have no guide flanges and are somewhat shorter in form in the radial direction R, so that small gaps 16, 17 are formed between the bushings 30 and the vane plates 22, 24 of the play vane 20. The gaps 16, 17 serve as a radial play between the vane plates 22, 24 and an inner collar flange 15d, so that the play vanes 20 can move radially in the play mount 15 in spite of the vane plates 22, 24.

Furthermore, in the second exemplary embodiment, it is provided that the inner ring 10 has a seal carrier 14 that consists of a plurality of carrier segments and is inserted radially inward and axially between the two inner ring segment sections 12, 13 and forms a radially inner-lying rest 14b on the vane mounts 15, 15' for the vane roots 21, 21' of the vanes 20, 20'. Formed or fastened on the seal carrier 14 are radially inner run-in linings 14c for forming a seal with one seal fin or a plurality of seal fins (not shown) that engage in the run-in lining 14c of a radially inner rotating rotor (not shown).

In the circumferential direction, the seal carrier has a nearly equal circumferential extension to that of the inner ring segments, which, however, are arranged offset to it in the circumferential direction, so that respective circumference-side front sides of the inner ring segments 11 and circumference-side front sides of the seal carrier segments 14a are arranged offset with respect to one another.

What is claimed is:

1. An axially divided inner ring segment for a variable vane cascade of an aircraft engine, comprising:
  a vane cascade having a group of variable vanes with vane roots and an axially divided inner ring on which the vane roots of the group of variable vanes are mounted;
  the inner ring formed from a plurality of inner ring segments, each of which having a row of vane mounts for mounting the vane roots of the group of variable vanes;
  wherein the row of vane mounts comprises at least one play mount and at least one guide mount that differs from the at least one play mount, and
  wherein the at least one guide mount is formed differently from the at least one play mount in regard to a geometry for mounting the vane roots;
  wherein the group of variable vanes including at least one play vane and at least one guide vane that is different from the at least one play vane, wherein the at least one guide vane is formed differently from the at least one play vane in regard to a geometry of the vane roots, wherein the vane root of the at least one guide vane has an inner plate where guide mounts in the row of vane mounts have an inner plate seat for an inner plate of the guide vanes;
  the guide mounts each having an inward projecting collar flange, which is formed between an inner plate and an outer plate of the guide vane that is arranged in the respective guide mount in the radial direction, with a high precision fit with a minimal play and/or minimal gaps formed between the collar flange and the outer plate and the inner plate.

2. The inner ring segment according to claim 1, wherein the row of vane mounts comprises two guide mounts.

3. The inner ring segment according to claim 1, wherein the at least one guide mount is arranged in a row adjacent to two play mounts.

4. The inner ring segment according to claim 1, wherein, at a second position in the row of vane mounts and/or at a penultimate position in the row of vane mounts, a guide mount is arranged.

5. The axially divided inner ring according to claim 1, wherein the inner ring further comprises a seal carrier including of a plurality of seal carrier segments,
- wherein the seal carrier forms a radially inner-lying rest at one or a plurality of the vane mounts from the row of vane mounts for the vane roots of the vanes, and/or
- wherein respective circumference-side front sides of the inner ring segments and circumference-side front sides of the seal carrier segments are arranged offset with respect to one another.

6. The variable vane cascade according to claim 1, wherein the vane roots arranged in the row of vane mounts have at least one first outer plate that faces a core flow channel of the aircraft engine and a radially inner-lying vane journal on it,
- wherein the vane roots are each formed with an inner plate that is arranged radially inward on the vane journal and is opposite-lying to the outer plate,
- wherein the at least one guide mount is formed differently from the at least one play mount in regard to radial gaps between the outer plates and/or the inner plates of the vane roots that are to be mounted and the vane mounts.

7. The variable vane cascade according to claim 6, wherein the radial gaps in the at least one guide mount are formed minimally in relation to a radial extension and in relation to manufacturing tolerances, so that the at least one guide mount and a guide vane that is to be arranged in it are formed in the radial direction with a high precision fit with respect to each other.

8. The variable vane cascade according to claim 1, wherein one of the vane mounts and one of the vane roots each form, as sliding partners, a sliding connection and in that at least one of the sliding partners has a sliding device, selected from the group consisting of a bushing or a coating.

9. The variable vane cascade according to claim 1, wherein the group of vanes comprises at least two guide vanes, and/or, in the row of vane mounts, at least two play vanes are arranged adjacent to the at least one guide vane and/or the at least one guide vane is arranged at a second position in the row of vane mounts and/or at a penultimate position in the row of vane mounts.

10. An aircraft engine having a vane cascade according to claim 1.

11. An aircraft engine having an inner ring according to claim 1.

12. An aircraft engine having an inner ring segment according to claim 1.

* * * * *